United States Patent
Zhamu et al.

(10) Patent No.: US 8,947,854 B2
(45) Date of Patent: Feb. 3, 2015

(54) SPACER-MODIFIED GRAPHENE ELECTRODE FOR SUPERCAPACITOR

(71) Applicants: Aruna Zhamu, Centerville, OH (US);
Zhenning Yu, Beavercreek, OH (US);
Chen-guang Liu, Dayton, OH (US);
Bor Z. Jang, Centerville, OH (US)

(72) Inventors: Aruna Zhamu, Centerville, OH (US);
Zhenning Yu, Beavercreek, OH (US);
Chen-guang Liu, Dayton, OH (US);
Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 129 days.

(21) Appl. No.: 13/573,844

(22) Filed: Oct. 9, 2012

(65) Prior Publication Data

US 2014/0098461 A1   Apr. 10, 2014

(51) Int. Cl.
*H01G 9/00* (2006.01)
*H01G 11/36* (2013.01)
*B82Y 30/00* (2011.01)

(52) U.S. Cl.
CPC ............ *H01G 11/36* (2013.01); *B82Y 30/00* (2013.01); *Y10S 977/734* (2013.01); *Y10S 977/932* (2013.01); *Y10S 977/948* (2013.01)
USPC ............ 361/502; 977/932; 977/948; 977/734

(58) Field of Classification Search
None
See application file for complete search history.

(56) References Cited

U.S. PATENT DOCUMENTS

| | | | |
|---|---|---|---|
| 2,798,878 A | 7/1957 | Hummers | |
| 7,623,340 B1 | 11/2009 | Song et al. | |
| 2008/0232028 A1 | 9/2008 | Zhao | |
| 2011/0157772 A1* | 6/2011 | Zhamu et al. | 361/502 |
| 2012/0208088 A1* | 8/2012 | Xie et al. | 429/231.8 |

OTHER PUBLICATIONS

U.S. Appl. No. 11/906,786, filed Oct. 4, 2007, A. Zhamu, et al.
U.S. Appl. No. 11/895,657, filed Aug. 27, 2007, A. Zhamu, et al.
U.S. Appl. No. 11/895,588, filed Aug. 27, 2007, A. Zhamu, et al.
U.S. Appl. No. 12/220,651, filed Jul. 28, 2008, A. Zhamu, et al.
U.S. Appl. No. 11/800,728, filed May 8, 2007, A. Zhamu, et al.
S. R. Vivekchand, et al., "Graphene-based Electrochemical Supercapacitor," J. Chem Sci., vol. 120 (Jan. 2008) pp. 9-13.
M. D. Stoller, et al, "Graphene-based Ultracapacitor," Nano Letters, Vo. 8 (2008) pp. 3498-3502.
X. Zhao, "Carbon Nanosheets as the Electrode Material in Supercapacitors," J. of Power Sources, 194 (2009) 1208-1212.
Y. Wang, "Supercapacitor Devices Based on Graphene Materials," J. Phys. Chem., C. 113 (2009) 13103-13107.
H. Wang, et al., "Graphene Oxide Doped Polyaniline for Supercapacitors," Electrochem. Communications, 11 (2009) 1158-1161.
Y. P. Zhang, et al. "Capacitive Behavior of Graphene-ZnO Composite Film for Supercapacitors," J. Electroanalytical Chem., 634 (2009) 68-71.

* cited by examiner

*Primary Examiner* — Dion R Ferguson

(57) ABSTRACT

A spacer-modified nano graphene platelet electrode, comprising: (a) multiple nano graphene platelets or sheets having an average thickness smaller than 10 nm; and (b) discrete, non-metallic nano-scaled particles that are disposed between two graphene platelets or sheets to serve as a spacer. In such a spacer-modified graphene electrode, large amounts of electrolyte-accessible pores are formed, enabling the formation of large amounts of electric double layer charges in a supercapacitor, which exhibits an exceptionally high specific capacitance.

19 Claims, 5 Drawing Sheets

100 nm

SPACER-MODIFIED GRAPHENE ELECTRODE FOR SUPERCAPACITOR

This invention is a divisional of U.S. patent application Ser. No. 12/655,247 filed on Dec. 28, 2009.

This invention is based on the results of a research project sponsored by the US DOE SBIR Program. The US government has certain rights on this invention.

FIELD OF THE INVENTION

The present invention relates generally to the field of supercapacitors or ultracapacitors, and more particularly to the nano graphene platelet-based electrode and supercapacitors containing such an electrode.

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but capacitors (with their ability to release energy much more quickly than batteries) would kick in whenever the car needs to accelerate for merging, passing, emergency maneuvers, and hill climbing. The EC must also store sufficient energy to provide an acceptable driving range. To be cost- and weight-effective compared to additional battery capacity they must combine adequate specific energy and specific power with long cycle life, and meet cost targets as well. Specifically, it must store about 400 Wh of energy, be able to deliver about 40 kW of power for about 10 seconds, and provide high cycle-life (>100,000 cycles).

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." In some ECs, stored energy is further augmented by pseudo-capacitance effects, occurring again at the solid-electrolyte interface due to electrochemical phenomena such as the redox charge transfer. The double layer capacitor is based on a high surface area electrode material, such as activated carbon, immersed in an electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called double-layer charges.

Experience with ECs based on activated carbon electrodes shows that the experimentally measured capacitance is always much lower than the geometrical capacitance calculated from the measured surface area and the width of the dipole layer. For very high surface area carbons, typically only about ten percent of the "theoretical" capacitance was observed. This disappointing performance is related to the presence of micro-pores and ascribed to inaccessibility of some pores by the electrolyte, wetting deficiencies, and/or the inability of a double layer to form successfully in pores in which the oppositely charged surfaces are less than about 2 nm apart. In activated carbons, depending on the source of the carbon and the heat treatment temperature, a surprising amount of surface can be in the form of such micro-pores.

It would be desirable to produce an EC that exhibits greater geometrical capacitance using a carbon based electrode having a high accessible surface area, high porosity, and reduced or no micro-pores. It would be further advantageous to develop carbon-based nano-structures that are conducive to the occurrence of pseudo-capacitance effects, such as the redox charge transfer.

Carbon nanotubes (CNT) are nanometer-scale sized tube-shaped molecules having the structure of a graphite molecule rolled into a rube. A nanotube can be single-walled or multi-walled, dependent upon conditions of preparation. Carbon nanotubes typically are electrically conductive and mechanically strong and stiff along their length. CNTs are being studied for electrochemical supercapacitor electrodes due to their unique properties and structure, which include high specific surface area (e.g. up to 1,300 $m^2/g$), high conductivity, and chemical stability. Capacitance values from 20 to 180 F/g have been reported, depending on CNT purity and electrolyte, as well as on specimen treatment such as $CO_2$ physical activation, KOH chemical activation, or exposure to nitric acid, fluorine, or ammonia plasma. Conducting polymers, such as polyacetylene, polypyrrole, polyaniline, polythiophene, and their derivatives, are also common electrode materials for supercapacitors. The modification of CNTs with conducting polymers is one way to increase the capacitance of the composite resulting from redox contribution of the conducting polymers. In the CNT/conducting polymer composite, CNTs are electron acceptors while the conducting polymer serves as an electron donor. A charge transfer complex is formed between CNTs in their ground state and aniline monomer. A number of studies on CNT/conducting polymer composites for electrochemical capacitor applications have been reported.

However, there are several drawbacks associated with carbon nanotube-filled composites. First, CNTs are known to be extremely expensive due to the low yield, low production rate, and low purification rate commonly associated with the current CNT preparation processes. The high material costs have significantly hindered the widespread application of CNTs. Second, CNTs tend to form a tangled mess resembling a hairball, which is difficult to work with (e.g., difficult to disperse in a liquid solvent or resin matrix). This and other difficulties have significantly limited the scope of application of CNTs.

Instead of trying to develop much lower-cost processes for making CNTs, researchers at Nanotek Instruments, Inc. have worked diligently to develop alternative nano-scaled carbon materials that exhibit comparable properties and can be mass-produced at much lower costs. This development work has led to the discovery of processes for producing individual nano-scaled graphite planes (individual single-layer graphene sheets) and stacks of multiple graphene sheets, which are collectively called nano graphene platelets (NGPs). A single-layer graphene sheet is basically a 2-D hexagon lattice of $sp^2$ carbon atoms covalently bonded along two plane directions. The sheet is essentially one carbon atom thick, which is smaller than 0.34 nm. The structures of NGPs may be best visualized by making a longitudinal scission on the single-wall or multi-wall of a nano-tube along its tube axis direction and then flattening up the structure to form a single-layer or multi-layer graphene platelet. In practice, NGPs are obtained from a precursor material, such as graphite particles, using a low-cost process, but not via flattening of CNTs. These nano materials are cost-effective substitutes for CNTs or other types of nano-rods for various scientific and engineering applications.

Nano graphene materials have recently been found to exhibit exceptionally high thermal conductivity, high electrical conductivity, and high strength. As a matter of fact, single-layer graphene exhibits the highest thermal conductivity and highest intrinsic strength of all currently known materials. Another outstanding characteristic of graphene is its exceptionally high specific surface area. A single graphene sheet provides a specific external surface area of approximately 2,675 $m^2$/g (that is accessible by liquid electrolyte), as opposed to the exterior surface area of approximately 1,300 $m^2$/g provided by a corresponding single-wall CNT (interior surface not accessible by electrolyte). The electrical conductivity of graphene is slightly higher than that of CNTs.

Two of the instant applicants (A. Zhamu and B. Z. Jang) and their colleagues were the first to investigate NGP- and other nano graphite-based nano materials for supercapacitor application [Please see Refs. 1-5 below; the 1$^{st}$ patent application was submitted in 2006 and issued in 2009]. After 2007, researchers began to realize the significance of nano graphene materials for supercapacitor applications [Refs. 6-12]

LIST OF REFERENCES

1. Lulu Song, A. Zhamu, Jiusheng Guo, and B. Z. Jang "Nano-scaled Graphene Plate Nanocomposites for Supercapacitor Electrodes" U.S. Pat. No. 7,623,340 (Nov. 24, 2009).
2. Aruna Zhamu and Bor Z. Jang, "Process for Producing Nano-scaled Graphene Platelet Nanocomposite Electrodes for Supercapacitors," U.S. patent application Ser. No. 11/906,786 (Oct. 4, 2007).
3. Aruna Zhamu and Bor Z. Jang, "Graphite-Carbon Composite Electrodes for Supercapacitors" U.S. patent application Ser. No. 11/895,657 (Aug. 27, 2007).
4. Aruna Zhamu and Bor Z. Jang, "Method of Producing Graphite-Carbon Composite Electrodes for Supercapacitors" U.S. patent application Ser. No. 11/895,588 (Aug. 27, 2007).
5. Aruna Zhamu and Bor Z. Jang, "Graphene Nanocomposites for Electrochemical cell Electrodes," U.S. patent application Ser. No. 12/220,651 (Jul. 28, 2008).
6. S. R. Vivekchand, et al., "Graphene-based Electrochemical Supercapacitor," J. Chem. Sci., Vol. 120 (January 2008) pp. 9-13.
7. M. D. Stoller, et al, "Graphene-based Ultracapacitor," Nano Letters, Vo. 8 (2008) pp. 3498-3502.
8. X. Zhao, "Carbon Nanosheets as the Electrode Material in Supercapacitors," J. of Power Sources," 194 (2009) 1208-1212.
9. X. Zhao, "Supercapacitors Using Carbon Nanosheets as Electrode," US Pat. Pub. No. 2008/0232028 (Sep. 25, 2008).
10. Y. Wang, "Supercapacitor Devices Based on Graphene Materials," J. Phys. Chem., C. 113 (2009) 13103-13107.
11. H. Wang, et al., "Graphene Oxide Doped Polyaniline for Supercapacitors," Electrochem. Communications, 11 (2009) 1158-1161.
12. Y. P. Zhang, et al. "Capacitive Behavior of Graphene-ZnO Composite Film for Supercapacitors," J. Electroanalytical Chem., 634 (2009) 68-71.

However, these prior art workers have failed to recognize the notion that individual nano graphene sheets have a great tendency to re-stack themselves, effectively reducing the specific surface areas that are accessible by the electrolyte in a supercapacitor electrode. The significance of this graphene sheet overlap issue may be illustrated as follows: For a nano graphene platelet with dimensions of l (length)×w (width)×t (thickness) and density ρ, the estimated surface area per unit mass is $S/m=(2/\rho)(1/l+1/w+1/t)$. With $\rho \cong 2.2$ g/cm$^3$, l=100 nm, w=100 nm, and t=0.34 nm (single layer), we have an impressive S/m value of 2,675 $m^2$/g, which is much greater than that of most commercially available carbon black or activated carbon materials used in the state-of-the-art supercapacitor. If two single-layer graphene sheets stack to form a double-layer NGP, the specific surface area is reduced to 1,345 $m^2$/g. For a three-layer NGP, t=1 nm, we have S/m=906 $m^2$/g. If more layers are stacked together, the specific surface area would be further significantly reduced. These calculations suggest that it is essential to find a way to prevent individual graphene sheets to re-stack and, even if they re-stack, the resulting multi-layer structure would still have inter-layer pores of adequate sizes. These pores must be sufficiently large to allow for accessibility by the electrolyte and to enable the formation of double-layer charges, which typically require a pore size of at least 2 nm.

Thus, it is an object of the present invention to provide surface-modified nano graphene sheets that naturally provide inter-layer pores when they stack or overlap with one another to form a supercapacitor electrode. The resulting electrode exhibits a high surface area typically greater than 100 $m^2$/gm, more typically greater than 300 $m^2$/gm, even more typically greater than 500 $m^2$/gm, and most typically greater than 1,000 $m^2$/gm. In many cases, the specific surface area reaches the theoretical value of 2,675 $m^2$/g, which translates into an ultra high specific capacitance.

Surface modifications were achieved by using a spacer approach in which nano-scaled spacer particles are either chemically bonded to or physically attached to a surface of a graphene sheet. It may be noted that although Zhang et al [Ref. 12] produced a hybrid graphene-ZnO film as a supercapacitor electrode, the ZnO layer was a complete, continuous film, which was not in the form of discrete particles and could not serve as a spacer. In Zhang's report, ZnO was used to offer a pseudo-capacitance effect, not a spacer.

SUMMARY OF THE INVENTION

One preferred embodiment of the present invention is a surface-modified nano graphene platelet, comprising: (a) a nano graphene platelet having a thickness smaller than 10 nm (preferably less than 1 nm and most preferably less than 0.4 nm); and (b) discrete, non-continuous, and non-metallic bumps or nodules bonded to a surface of the graphene platelet to serve as a spacer. Preferably, there are multiple bumps or nodules bonded to both surfaces of the platelet to effectively increase a specific surface area of the platelet.

The bumps or nodules contain a material selected from the group consisting of carbon, pitch, metal oxide, metal carbide, metal nitride, metal sulfide, metal halide, and combinations thereof. Preferably, the bumps or nodules contain a material selected from the group consisting of $RuO_2$, $IrO_2$, NiO, $MnO_2$, $VO_x$, $TiO_2$, $Cr_2O_3$, $CO_2O_3$, $PbO_2$, $Ag_2O$, $MoC_x$, $Mo_2N$, $WC_x$, $WN_x$, and combinations thereof. The spacer carbon may be produced by pyrolyzing a polymeric material coated onto a surface of the graphene platelet. Preferably, the spacer carbon is produced by pyrolyzing a polymeric coating substance selected from the group consisting of phenol-formaldehyde, polyacrylonitrile, styrene divinyl benzene, cellulosic polymers, polyfurfuryl alcohol, cyclotrimerized diethynyl benzene, and combination thereof.

The bumps or nodules preferably have a height no less than 1 nm, further preferably no less that 2 nm. The main goal is for the spacer to help create pores that are larger than 2 nm when multiple NGPs are stacked together.

The graphene platelet preferably has no more than 5 graphene layers, more preferably no more than 3 layers, and most preferably single-layer so that the modified nano graphene platelet exhibits a specific surface area greater than 500 $m^2/g$, preferably greater than 900 $m^2/g$, more preferably greater than 1,384 $m^2/g$, and most preferably greater than 2,600 $m^2/g$.

Another embodiment of the present invention is an electrochemical cell electrode comprising a surface-modified nano graphene platelet as described above. This electrochemical cell may be a supercapacitor, a lithium ion battery, a lithium metal battery, a lithium-air battery, an alkali battery, or an alkaline battery.

A preferred embodiment of the present invention is a supercapacitor comprising two electrodes, a porous separator disposed between the two electrodes, and electrolyte in physical contact with the two electrodes, wherein at least one of the two electrodes comprises a surface-modified nano graphene platelet as defined above. Further preferably, both electrodes comprise such a modified graphene platelet.

Further, the electrochemical cell electrode preferably comprises a plurality of surface-modified nano graphene platelets as defined above, wherein multiple platelets form a stack having pores between platelets. The pores preferably have a size greater than 2 nm. Hence, another preferred embodiment of the present invention is a supercapacitor, wherein at least one of the two electrodes comprises such a multi-NGP electrode. Most preferably, both electrodes are of this type.

The surface-modified nano graphene platelet may be activated to form an activated platelet, functionalized, or both activated and chemically functionalized. In one preferred embodiment, the surface-modified nano graphene platelet is functionalized with one or more functional groups selected from the group consisting of —$SO_3$, —R'COX, —R'$(COOH)_2$, —CN, —R'$CH_2$X, —OH, —R'CHO, —R'CN, wherein R' is a hydrocarbon radical, and wherein X is —$NH_2$, —OH, or a halogen.

Still another embodiment of the present invention is a spacer-modified nano graphene platelet electrode, comprising: (a) multiple nano graphene platelets having an average thickness smaller than 10 nm; and (b) discrete, non-metallic nano-scaled particles that are disposed between two graphene platelets to serve as a spacer. The spacer particles are selected from the group consisting of carbon nanotubes, carbon nano-wires, carbon nano-fibers, graphitic nano-fibers, carbon black, activated carbon, nano-wires, ceramic nano particles, polymer nano particles, nano particles of metal oxides excluding zinc oxide, metal carbides, metal nitrides, metal sulfides, metal-halogen compounds, metal chalcogenides, and combinations thereof. Preferably, spacer particles cover an area less than 50% (more preferably less than 30%) of a surface of a nano graphene platelet.

The platelets preferably comprise single-layer graphene. The electrode has a specific surface area preferably greater than 500 $m^2/g$, more preferably greater than 900 $m^2/g$, even more preferably greater than 1,300 $m^2/g$, and most preferably greater than 2,600 $m^2/g$.

Another embodiment of the present invention is a supercapacitor comprising two electrodes, a porous separator disposed between the two electrodes, and electrolyte in physical contact with the two electrodes, wherein at least one of the two electrodes is a spacer-modified nano graphene platelet electrode as described above. Most preferably, both electrodes are spacer-modified nano graphene platelet electrodes.

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

For the purpose of defining the geometry of an NGP, the NGP is described as having a length (the largest dimension), a width (the second largest dimension), and a thickness. The thickness is the smallest dimension, which is no greater than 100 nm and, in the present application, no greater than 10 nm (preferably no greater than 2 nm, more preferably no greater than 1 nm, and most preferably no greater than 0.4 nm or single-layer graphene only). When the platelet is approximately circular in shape, the length and width are referred to as diameter. In the presently defined NGPs, there is no limitation on the length and width, but they are preferably smaller than 10 μm and more preferably smaller than 1 μm. We have been able to produce NGPs with length smaller than 100 nm or larger than 10 μm.

Figure 1:
FIG. 1 A transmission electron microscopic image of NGPs without surface modification; graphene sheets significantly overlap one another to reduce the available surface area.
Figure 2:
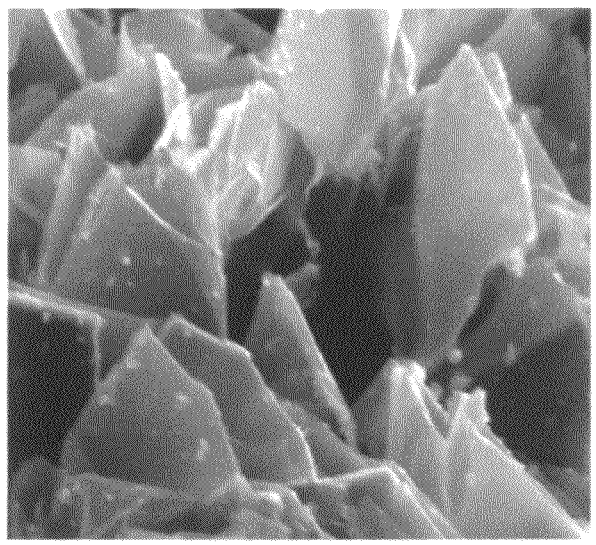
FIG. 2 SEM image of slightly surface-modified NGPs, showing some surface nodules.
Figure 3:
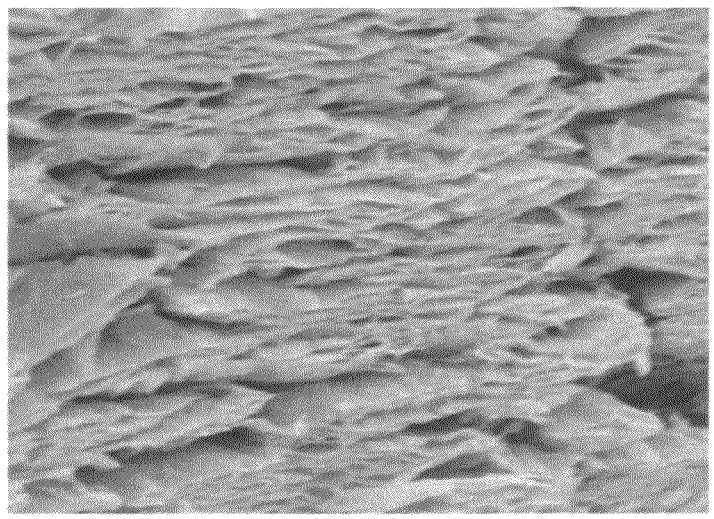
FIG. 3 An electrode structure comprising multiple surface-modified NGPs overlapped together, but slightly separated due to the presence of spacer nodules, resulting in the formation of electrolyte-accessible pores.

Despite the fact that individual graphene sheets have exceptionally high specific surface area, un-modified graphene sheets have a great tendency to re-stack together or overlap one another, thereby dramatically reducing the specific surface area that is accessible by the electrolyte. This phenomenon is illustrated in FIG. 1, wherein several single-layer graphene sheets overlap and re-stack tightly. There is no discernable gap or pore between two graphene sheets overlapped together. FIG. 2 shows some multi-layer graphene platelets with their surfaces slightly modified, having some discrete nodules or bumps. FIG. 3 shows an electrode structure composed of multiple NGPs with their surfaces bonded with carbon nodules that cover approximately 25% of a surface area. Clearly, the surface-bonded nodules serve as a spacer that helps to prevent individual graphene sheets from re-stacking, resulting in inter-sheet pores that are typically greater than 2 nm in size.

Hence, one preferred embodiment of the present invention is a surface-modified nano graphene platelet, comprising: (a) a nano graphene platelet having a thickness smaller than 10 nm (preferably less than 1 nm and most preferably less than 0.4 nm); and (b) discrete, non-continuous, and non-metallic bumps or nodules bonded to a surface of the graphene platelet to serve as a spacer. Preferably, there are multiple bumps or nodules bonded to both surfaces of the platelet to effectively increase a specific surface area of the platelet.

A preferred material for these bumps or nodules is carbon due to its good ability to bond to the graphene substrate and carbon is also known to be capable of forming double layer charges near its interface with the electrolyte. As an example, discrete carbon nodule-bonded graphene sheets may be obtained with any one of the following processes:

The first process entails:
 (a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
 (b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness<100 nm could be formed at this stage if the intercalation/oxidation step was allowed to proceed for a sufficiently long duration of time; e.g. 24 hours);
 (c) re-dispersing the exfoliated graphite to a liquid medium containing an acid (e.g., sulfuric acid), an oxidizing agent (e.g. nitric acid), or an organic solvent (e.g., NMP) to form a suspension. Stirring, mechanical shearing, or ultrasonication can be used to break up graphite worms to form oxidized NGPs to accelerate the dispersion step;
 (d) optionally allowing the oxidized NGPs to stay in the liquid medium at a desired temperature for a duration of time until the oxidized NGPs are converted into individual single-layer graphene oxide sheets dissolved in the liquid medium;
 (e) dissolving a desired amount of polymer, resin, or pitch (e.g., petroleum or coal tar pitch) in the liquid medium;
 (f) removing (e.g. vaporizing) the liquid to recover polymer-, resin-, or pitch-coated NGPs (e.g., resin-to-NGP weight ratio of 1/100 to 1/10);
 (g) carbonizing the polymer, resin, or pitch at a temperature of 400-1,200° C. for typically 0.5 to 5 hours to form discrete carbon nodules bonded onto NGP surfaces.

It may be noted that steps (a) to (c) are the most commonly used steps to obtain graphene oxide platelets in the field. However, we were surprised to observe that step (d) was capable of converting all NGPs into single-layer graphene or graphene oxide sheets dissolved or dispersed in a liquid. Oxidized NGPs or GO platelets may be chemically reduced to recover conductivity properties using hydrazine as a reducing agent.

As a second example, the process includes:
 (a) Preparing a suspension containing pristine nano graphene platelets (NGPs) dispersed in a liquid medium using, for instance, direct ultrasonication (e.g., a process disclosed by us in U.S. patent application Ser. No. 11/800,728 (May 8, 2007));
 (b) dissolving a desired amount of polymer, resin, or pitch (e.g., petroleum or coal tar pitch) in the liquid medium in the liquid medium;
 (c) removing (e.g. vaporizing) the liquid to recover polymer-, resin-, or pitch-coated NGPs (e.g., resin-to-NGP weight ratio of 1/100 to 1/10);
 (d) carbonizing the polymer, resin, or pitch at a temperature of 400-1,200° C. for typically 0.5 to 5 hours to form discrete carbon nodules bonded onto NGP surfaces.

In order to prepare graphene sheets bonded with nodules of metal oxide, metal carbide, metal nitride, metal halide, or metal sulfide, one may choose to use chemical vapor deposition (CVD), physical vapor deposition (PVD), plasma-enhanced CVD, sputtering, arc deposition, plasma arc deposition, spray pyrolysis, and solution phase deposition. For instance, one may expose graphene sheets to a stream of silane and oxygen mixture gas in a high-temperature tube furnace (e.g. at a temperature of 600-900° C.) for a short period of time to deposit silicon oxide particles onto the NGP surfaces. Particle deposition processes are well-known in the art.

Hence, in a preferred embodiment, the bumps or nodules contain a material selected from the group consisting of carbon, pitch, metal oxide, metal carbide, metal nitride, metal sulfide, and combinations thereof. Preferably, the bumps or nodules contain a material selected from the group consisting of $RuO_2$, $IrO_2$, $NiO$, $MnO_2$, $VO_x$, $PbO_2$, $Ag_2O$, $MoC_x$, $Mo_2N$, $WC_x$, $WN_x$, and combinations thereof. The spacer carbon may be produced by pyrolyzing a polymeric material coated onto a surface of the graphene platelet. Preferably, the spacer carbon is produced by pyrolyzing a polymeric coating substance selected from the group consisting of phenol-formaldehyde, polyacrylonitrile, styrene divinyl benzene, cellulosic polymers, polyfurfuryl alcohol, cyclotrimerized diethynyl benzene, and combination thereof.

The bumps or nodules preferably have a height no less than 1 nm, further preferably no less that 2 nm. The main goal is for the spacer to help create pores that are larger than 2 nm when NGPs are stacked together. The graphene platelet preferably has no more than 5 graphene layers, more preferably no more than 3 layers, and most preferably single-layer so that the modified nano graphene platelet exhibits a specific surface area greater than 500 $m^2/g$, preferably greater than 900 $m^2/g$, more preferably greater than 1,384 $m^2/g$, and most preferably greater than 2,600 $m^2/g$.

When the platelets have an average length, width, or diameter no greater than 1 gm and average thickness no greater than 10 nm, the resulting NGP electrode tends to have a surface area greater than 300 $m^2/gm$. When the average NGP thickness is 2 nm or smaller, the resulting electrode typically has a surface area greater than 500 $m^2/gm$. A single-layer graphene exhibits a specific area greater than 1,600 $m^2/gm$.

Another preferred embodiment of the present invention is a spacer-modified nano graphene platelet electrode, comprising: (a) multiple nano graphene platelets having an average thickness smaller than 10 nm; and (b) discrete, non-metallic nano-scaled particles that are disposed between two graphene platelets to serve as a spacer. These particles are intentionally resided between two NGPs, but not necessarily chemically bonded to any NGP surface.

The spacer particles are selected from the group consisting of carbon nanotubes, carbon nano-wires, carbon nano-fibers, graphitic nano-fibers, carbon black, activated carbon, nano-wires, ceramic nano particles, polymer nano particles, nano particles of metal oxides excluding zinc oxide, metal carbides, metal nitrides, metal sulfides, metal-halogen compounds, metal chalcogenides, and combinations thereof.

These spacer particles may be added to an NGP solution or suspension as prepared according to one of the aforementioned processes. The resulting slurry may be subjected to mechanical shearing, stirring, or ultrasonication to achieve a homogeneous mixing or dispersion of the space particles. The slurry may then be cast onto a substrate, filtered through a porous Teflon membrane, or allowed to go through a paper-making process to form a sheet of porous film, mat, or paper, which is then used as an electrode.

These spacer particles have a size preferably greater than 1 nm and more preferably greater than 2 nm, but most preferably between 2 nm and 200 nm. The spacer particles preferably cover an area less than 50% of a surface of a nano graphene platelet, more preferably less than 30% of a surface of a nano graphene platelet.

Another embodiment of the present invention is a supercapacitor comprising two electrodes, a porous separator disposed between the two electrodes, and electrolyte in physical contact with the two electrodes, wherein at least one, preferably both, of the two electrodes comprises a spacer-modified electrode as defined above.

The NGPs used in the aforementioned electrode may be subjected to the following treatments, separately or in combination, before or after the surface modification or spacer incorporation operation:
 (a) chemically functionalized;
 (b) coated or grafted with a conductive polymer,
 (c) deposition with transition metal oxides or sulfides, such as $RuO_2$, $TiO_2$, $MnO_2$, $Cr_2O_3$, and $Co_2O_3$, for the purpose of imparting pseudo-capacitance to the electrode;
 (d) subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

Conducting polymers, such as polyacetylene, polypyrrole, polyaniline, polythiophene, and their derivatives, are good choices for use in the present invention. These treatments are intended for further increasing the capacitance value through pseudo-capacitance effects such as redox reactions. Alternatively, transition metal oxides or sulfides such as $RuO_2$, $TiO_2$, $MnO_2$, $Cr_2O_3$, and $Co_2O_3$ can be deposited onto the NGP surface for pseudo-capacitance. Other useful surface functional groups may include quinone, hydroquinone, quaternized aromatic amines, mercaptans, or disulfides. This latter class of functional groups also has been shown to impart pseudo-capacitance to CNT-based supercapacitors.

The following examples serve to illustrate the preferred embodiments of the present invention and should not be construed as limiting the scope of the invention:

Example 1

Graphene from Carbon/Graphite Fibers

Continuous graphite fiber yarns (Magnamite from Hercules) were cut into segments of 5 mm long and then ball-milled for 48 hours. Approximately 20 grams of these milled fibers were immersed in a mixture of 2 L of formic acid and 0.1 L of hydrogen peroxide at 45° C. for 60 hours. Following the chemical oxidation intercalation treatment, the resulting intercalated fibers were washed with water and dried. The resulting product is a formic acid-intercalated graphite fiber material containing graphite oxide crystallites.

Subsequently, approximately ½ of the intercalated or oxidized fiber sample was transferred to a furnace pre-set at a temperature of 600° C. for 30 seconds. The compound was found to induce extremely rapid and high expansions of graphite crystallites. The as-exfoliated graphite fiber is designated as Sample-1 a. Approximately half of Sample 1-a material was subjected to de-oxygenation at 1,100° C. for 20 minutes in a nitrogen atmosphere to obtain Sample-1b.

A small amount of the two materials was separately mixed with an aqueous ethanol solution to form two separate suspensions, which were subjected to further separation of exfoliated flakes using a Cowles shearing device. Both graphite oxide platelets (Sample 1-a) and reduced GO platelets (essentially NGPs) were found to be soluble and well-dispersed in this aqueous solution.

Two separate processes were conducted to prepare surface-modified NGPs and electrodes composed of spacer/NGP stacks. In one process, a small amount of polyethylene oxide (PEO) was dissolved in the suspension containing graphene oxide or reduced graphene platelets to obtain a 2% polymer solution. The suspension was subjected to a spray-drying treatment at approximately 100° C. to remove water and ethanol. The PEO-coated NGP or GO platelets were then placed into a tube furnace preset at 700° C. for two hours. Discrete carbon nodules were found to be well-bonded to NGP and GO surfaces.

In another process, carbon black (CB) particles and multi-walled carbon nanotubes (CNT) were separately added into the GO and NGP solution, respectively, with a CB-to-GO ratio of 5/95 and CNT-to-NGP ratio of 10/90. The resulting suspension was then cast into a glass substrate, followed by a liquid removal step. The dried mat was used as a supercapacitor electrode.

Example 2

Graphene from Sulfuric Acid Intercalation and Exfoliation of MCMBs

MCMB 2528 microbeads were supplied by Alumina Trading, which was the U.S. distributor for the supplier, Osaka Gas Chemical Company of Japan. This material has a density of about 2.24 $g/cm^3$; a particle size maximum for at least 95% by weight of the particles of 37 microns; median size of about 22.5 microns and an inter-planar distance of about 0.336 nm. MCMB 2528 (10 grams) were intercalated with an acid solution (sulfuric acid, nitric acid, and potassium permanganate at a ratio of 4:1:0.05) for 30 minutes. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The dried powder sample was placed in a quartz tube and inserted into a horizontal tube furnace pre-set at a desired temperature, 600° C. for 30 seconds to obtain Sample 2-a. A small quantity of the sample was mixed with water and ultrasonicated at a 60 W power for 10 minutes to obtain a suspension.

Nano particles of TiO$_2$ produced in house by a plasma arc process and a small quantity of water-soluble PEO were added to this graphene suspension with a TiO$_2$:PEO:NGP ratio of 5:5:90. The resulting suspension was then cast into a glass substrate, followed by a water removal step. The dried film was then subjected to a heat treatment at 700° C. in a flowing nitrogen environment for one hour to carbonize the polymer. The resulting carbon serves as a conductive binder to bond the TiO$_2$ nano particles to NGP surfaces. The resulting porous mat with TiO$_2$ particles serving as a spacer was used as a supercapacitor electrode.

Example 3

Oxidation, Exfoliation, and De-Oxygenation of Natural Graphite

Graphite oxide was prepared by oxidation of natural flake graphite with sulfuric acid, sodium nitrate, and potassium permanganate at a ratio of 4:1:0.05 at 30° C. for 24 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å), indicating that graphite has been converted into graphite oxide.

The dried, intercalated (oxidized) compound was placed in a quartz tube that was inserted into a horizontal tube furnace pre-set at 1,050° C. to effect exfoliation for 1 minute. The resulting exfoliated graphite was dispersed in water and subjected to ultrasonication for 10 minutes to obtain a nano graphene oxide suspension. The suspension was spray-dried to recover NGP powder, which was then transferred to a rotating quartz tube inside a tube furnace preset at 950° C. Silane gas was introduced into the quartz tube, along with a small stream of oxygen for up to five minutes. It was observed that discrete silicon dioxide nodules were bonded onto graphene surfaces with such a short reaction time. In a separate run, the chemical vapor deposition time was allowed to exceed 15 minutes, leading to the formation of continuous silicon dioxide film, instead of discrete particles. A continuous film on an NGP surface is not an effective spacer.

Example 4

Spacer-Modified NGPs Further Treated with Poly(3-methyl-thiophene)

Electronically conductive polymers by themselves are promising supercapacitor electrode materials because the charge process involves the entire polymer mass and they provide low equivalent series resistance for the electrode. When combined with an NGP-type substrate material, the conducting polymer can impart pseudo-capacitance to the electrode. One desirable conductive polymer selected was poly(3-methyl-thiophene) (pMeT), particularly its p-doped variant. Poly(3-methyl-thiophene) could be synthesized by oxidative chemical polymerization technique using ferric chloride as a dopant in an inert atmosphere. However, we chose to prepare PMeT doped with different anions electrochemically in the presence of tetra-alkyl-ammonium salts using a carbon nodule-bonded NGP mat prepared in Example 1 as an electrode. The specific capacitance of an NGP mat, a spacer-modified NGP mat with no further treatment, and a spacer-modified NGP mat with a pMeT treatment were found to be 78 F/g, 190 F/g, and 243 F/g, respectively. These data have clearly demonstrated that the presently invented spacer approach is surprisingly effective in helping NGP-based electrodes to achieve a much higher capacitance as compared with NGPs without a spacer.

This impressive result was achieved with low-cost NGPs, as opposed to expensive CNT-based materials. A multi-wall CNT/poly(3,4-ethylenedioxythiophene) composite, prepared by chemical or electrochemical polymerization, when evaluated in 1 M H$_2$SO$_4$, 6 M KOH, or 1 M tetraethylammonium tetrafluoroborate (TEABF4) in acetonitrile, exhibited capacitance values of 60 to 160 F/g. However, CNT materials are much more expensive.

Example 5

Transition Metal Halide as a Spacer

A number of transition metal halides bearing a 2,6-bis (imino)piridyl ligand, LMCl$_2$, where L=2,6-(ArNCCH$_3$)$_2$C$_5$H$_3$N and M=transition metal atom), have been synthesized (prior art). The manganese halide complex (M=Mn) was electrochemically deposited onto the surface of an NGP mat electrode in a water-containing acetonitrile electrolyte (containing 0.1 M of tetra-butyl-ammonium perchlorate). By adjusting the imposing current density and reaction time one could readily form discrete particles bonded onto NGP surfaces. With less than 10% by weight of manganese halide particles, the specific capacitance of the NGP mat was increased from 98 F/g to 189 F/g. Other transition metal oxides or sulfides can also be used as a spacer as well as a source of pseudocapacitance.

Example 6

Effect of the Spacer Nodule Amount

Additional series of samples were prepared with NGPs prepared from a process similar to those described in Example 2. The NGP sheets were then dispersed in acetone in which phenolic resin was added. The ratio of phenolic resin to NGP was varied to obtain different phenolic resin-coated NGPs. Surface-bonded carbon nodules were formed when the various phenolic resin-coated NGP samples were cured at 150-200° C. for two hours, followed by carbonization at 900° C. for one hour. NGPs bonded with carbon nodules that cover a range of graphene surface areas were obtained. These surface nodule-modified NGPs were made into a paper form with NGPs being stacked up in an organized manner to make a porous electrode (e.g., FIG. 3).

Figure 4A:
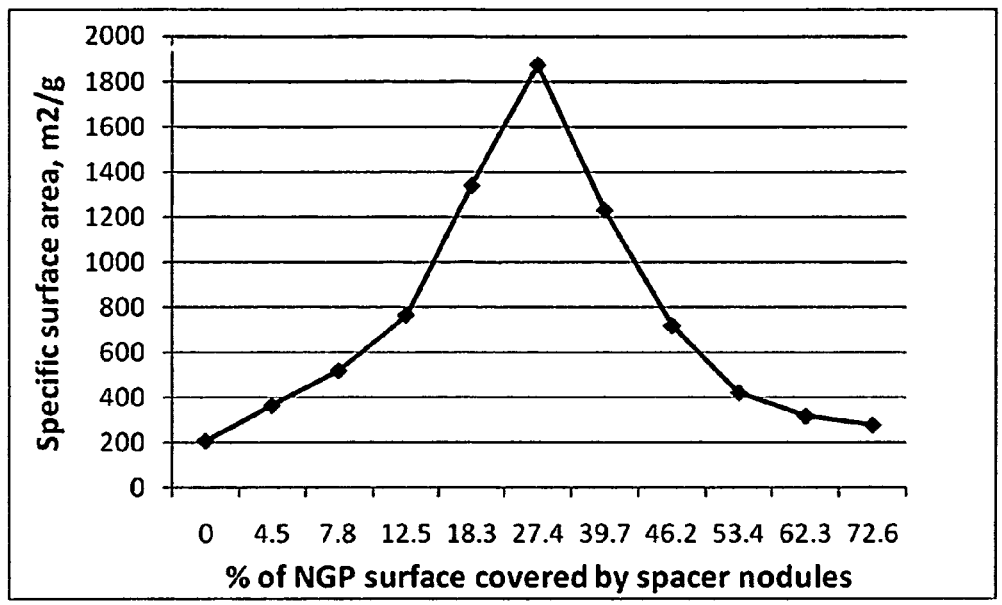
FIGS. 4 (A) and (B) show the specific surface area and specific capacitance of electrodes containing carbon nodule-modified NGPs plotted as a function of the percentage area of the NGP surface being covered by carbon nodules. The correlation between the specific surface area and the specific capacitance is shown in (C).
Figure 4B:
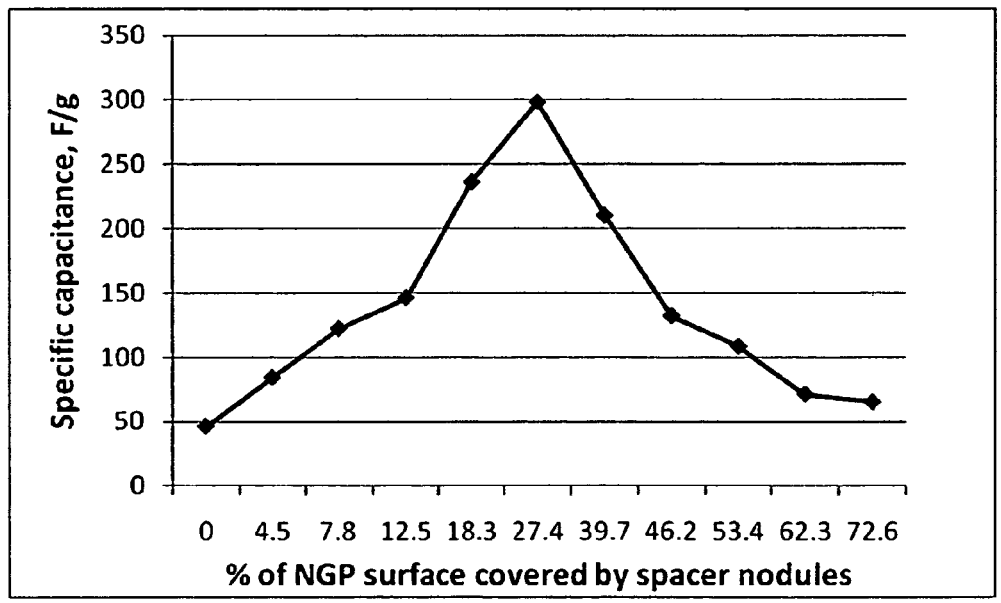
Figure 4C:
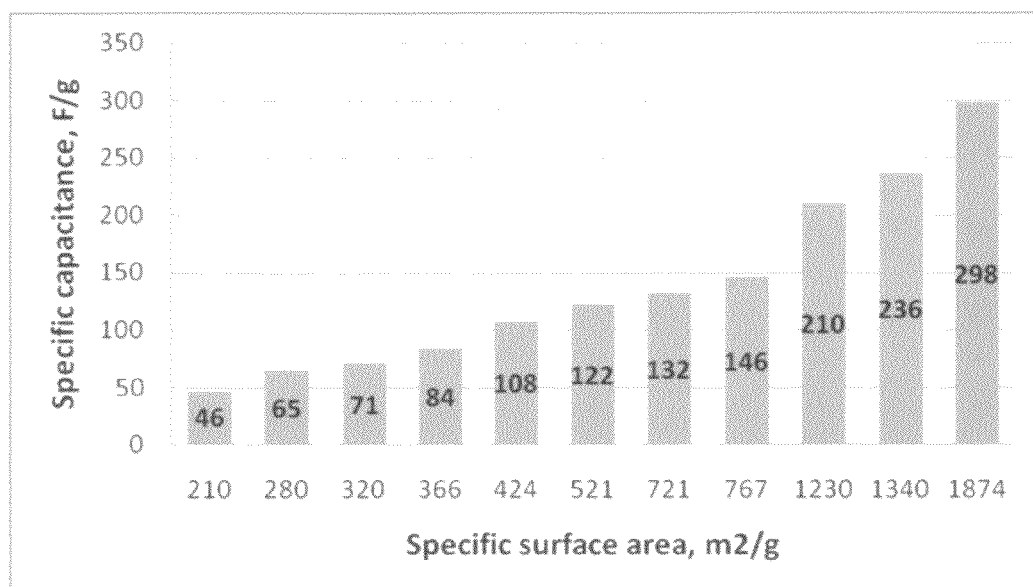

Supercapacitor cells with both electrodes made of these spacer-modified NGPs were prepared and evaluated. The results were summarized in FIG. 4. FIG. 4 (A) and FIG. 4(B) show that the specific surface area of the electrode and the corresponding specific capacitance of the supercapacitor cell increases initially with the nodule coverage area, reaches a peak at approximately 27.4% surface coverage, and then begins to decay after that. This observation implies that there exists an optimum spacer content to maximize the surface areas accessible by the electrolyte. There is a clear correlation between the specific capacitance and the specific surface area as shown in FIG. 4(C). The specific surface area based on double layer capacitance alone, without a contribution from redox-based pseudo-capacitance, reaches a range of 200-300 F/g, which is much higher than what could be achieved with carbon nano-tubes and nano graphene sheets without surface spacer modification. The presently invented spacer approach enables a supercapacitor designer to take full advantage of the high specific surface area of graphene-based materials by overcoming the most severe technical problem associated with this new class of nano materials for supercapacitor applications (i.e. the tendency to overlap and re-stack with one another and, hence, dramatically reduce the effective surface areas).

In conclusion, we have successfully developed a new and novel class of spacer-modified nano graphene platelets that are superior supercapacitor electrode materials. A supercapacitor can make use of this material in one or both of the electrodes. These NGP-based nano materials exhibit exceptionally high capacitance and electrical conductivity. Other desirable features of NGPs include chemical stability and low mass density. They are also of lower costs compared with carbon nano-tube based materials. Both NGPs and modified NGPs can be mass-produced cost-effectively.

We claim:

1. A spacer-modified nano graphene platelet electrode, comprising:
   (a) multiple nano graphene platelets or sheets having an average thickness smaller than 10 nm; and
   (b) discrete, non-metallic nano-scaled particles that are disposed between two graphene platelets or sheets to serve as a spacer that prevents re-stacking of said graphene platelets or sheets with one another, wherein said spacer particles cover an area less than 50% of a surface of a nano graphene platelet or sheet.

2. The spacer-modified nano graphene platelet electrode of claim 1, wherein said spacer particles are selected from the group consisting of carbon nanotubes, carbon nano-wires, carbon nano-fibers, graphitic nano-fibers, carbon black, activated carbon, nano-wires, ceramic nano particles, polymer nano particles, nano particles of metal oxides excluding zinc oxide, metal carbides, metal nitrides, metal sulfides, metal-halogen compounds, metal chalcogenides, and combinations thereof.

3. The spacer-modified nano graphene platelet electrode of claim 1, wherein said spacer particles cover an area less than 30% of a surface of a nano graphene platelet or sheet.

4. The spacer-modified nano graphene platelet electrode of claim 1, wherein said platelets or sheets comprise single-layer graphene.

5. The spacer-modified nano graphene platelet electrode of claim 1, wherein said electrode has a specific surface area greater than 500 $m^2$/g.

6. The spacer-modified nano graphene platelet electrode of claim 1, wherein said electrode has a specific surface area greater than 900 $m^2$/g.

7. The spacer-modified nano graphene platelet electrode of claim 1, wherein said electrode has a specific surface area greater than 1,300 $m^2$/g.

8. The spacer-modified nano graphene platelet electrode of claim 1, wherein said electrode has a specific surface area greater than 2,600 $m^2$/g.

9. A supercapacitor comprising two electrodes, a porous separator disposed between the two electrodes, and electrolyte in physical contact with the two electrodes, wherein at least one of the two electrodes comprises an electrode as defined in claim 1.

10. A supercapacitor comprising two electrodes, a porous separator disposed between the two electrodes, and electrolyte in physical contact with the two electrodes, wherein each of the two electrodes comprises an electrode as defined in claim 1.

11. The spacer-modified nano graphene platelet electrode of claim 1, wherein said discrete, non-metallic nano-scaled particles contain a material selected from the group consisting of carbon, pitch, metal oxide, metal carbide, metal nitride, metal sulfide, metal halide, and combinations thereof.

12. The spacer-modified nano graphene platelet electrode as defined in claim 1, wherein said discrete, non-metallic nano-scaled particles contain a material selected from the group consisting of $RuO_2$, $IrO_2$, NiO, $MnO_2$, $VO_x$, $TiO_2$, $Cr_2O_3$, $Co_2O_3$, $PbO_2$, $Ag_2O$, $MoC_x$, $Mo_2N$, $WC_x$, $WN_x$, and combinations thereof.

13. The spacer-modified nano graphene platelet electrode as defined in claim 1, wherein said discrete, non-metallic nano-scaled particles comprise carbon produced by pyrolyzing a polymeric material coated onto a surface of said graphene platelet.

14. The spacer-modified nano graphene platelet electrode as defined in claim 1, wherein said discrete, non-metallic nano-scaled particles comprise carbon produced by pyrolyzing a polymeric coating substance selected from the group consisting of phenol-formaldehyde, polyacrylonitrile, styrene divinyl benzene, cellulosic polymers, polyfurfuryl alcohol, cyclotrimerized diethynyl benzene, and combination thereof.

15. The spacer-modified nano graphene platelet electrode as defined in claim 1, wherein said discrete, non-metallic nano-scaled particles have a size no less than 2 nm.

16. The spacer-modified nano graphene platelet electrode as defined in claim 1, wherein said graphene platelets or sheets contain single-layer graphene.

17. The spacer-modified nano graphene platelet electrode as defined in claim 1, wherein said graphene platelets contain a few-layer graphene platelet having no more than five graphene planes.

18. The spacer-modified nano graphene platelet electrode as defined in claim 1, wherein said spacer-modified nano graphene platelets or sheets are functionalized.

19. The spacer-modified nano graphene platelet electrode as defined in claim 1, wherein said spacer-modified nano graphene platelets or sheets are functionalized with one or more functional groups selected from the group consisting of —$SO_3$, —R'COX, —R'$(COOH)_2$, —CN, —R'$CH_2$X, —OH, —R'CHO, —R'CN, wherein R' is a hydrocarbon radical, and wherein X is —$NH_2$, —OH, or a halogen.

* * * * *